United States Patent
Li et al.

(10) Patent No.: US 8,880,288 B2
(45) Date of Patent: Nov. 4, 2014

(54) DETERMINING LOW-SPEED DRIVING DIRECTION IN A VEHICLE

(75) Inventors: Qingyuan Li, Ann Arbor, MI (US); Hsien-cheng (Kevin) Wu, Novi, MI (US); Tim Hoerauf, St. Clair Shores, MI (US); Jiamu Hu, Rochester Hills, MI (US); Timothy Ridley, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 599 days.

(21) Appl. No.: 12/704,253

(22) Filed: Feb. 11, 2010

(65) Prior Publication Data
US 2010/0318255 A1 Dec. 16, 2010

Related U.S. Application Data

(60) Provisional application No. 61/187,568, filed on Jun. 16, 2009.

(51) Int. Cl.
| | |
|---|---|
| *B60W 30/06* | (2006.01) |
| *B60W 40/10* | (2012.01) |
| *B62D 103/00* | (2006.01) |
| *B62D 111/00* | (2006.01) |
| *B62D 133/00* | (2006.01) |
| *G01P 13/04* | (2006.01) |
| *G05D 1/02* | (2006.01) |
| *B60T 8/172* | (2006.01) |
| *B62D 15/02* | (2006.01) |
| *F16H 59/44* | (2006.01) |
| *F16H 59/66* | (2006.01) |

(52) U.S. Cl.
CPC .......... *B60W 40/10* (2013.01); *F16H 2059/443* (2013.01); *F16H 59/44* (2013.01); *F16H 59/66* (2013.01); *G01P 13/04* (2013.01); *G05D 1/021* (2013.01); *B60W 30/06* (2013.01); *B60T 8/172* (2013.01); *B62D 15/0285* (2013.01); *B60T 2201/10* (2013.01); *F16H 2059/663* (2013.01)
USPC ................... 701/36; 701/42; 701/45; 701/70; 180/199; 180/204; 340/435; 340/436; 340/932.2

(58) Field of Classification Search
None
See application file for complete search history.

(56) References Cited

U.S. PATENT DOCUMENTS

| | | | |
|---|---|---|---|
| 6,141,605 | A | 10/2000 | Joyce |
| 6,272,403 | B2 | 8/2001 | Sugitani et al. |

(Continued)

FOREIGN PATENT DOCUMENTS

| | | |
|---|---|---|
| DE | 102006054516 | 6/2007 |
| EP | 0849142 | 6/1998 |

(Continued)

OTHER PUBLICATIONS

Pasquier, M.; Quek, C.; Tung, W.L.; Chen, D.; Yep, T.M.;, "Fuzzylot II: a novel soft computing approach to the realisation of autonomous driving manoeuvres for intelligent vehicles," Control, Automation, Robotics and Vision, 2002. ICARCV 2002. 7th International Conference on , vol. 2, no., pp. 746-751 vol. 2, Dec. 2-5, 2002 doi: 10.1109/ICARCV.2002.*

(Continued)

*Primary Examiner* — Redhwan K Mawari
*Assistant Examiner* — Edward Torchinsky
(74) *Attorney, Agent, or Firm* — Michael Best & Friedrich LLP

(57) ABSTRACT

A method and a system of determining a driving direction of a vehicle traveling at a low speed. The method includes determining whether the vehicle is in one of three states: (1) an uphill state in which the vehicle is located on an upward sloping surface, (2) a downhill state in which the vehicle is located on a downward sloping surface, and (3) a flat surface state in which the vehicle is located on a flat surface. The method also includes obtaining information from a plurality of vehicle sensors and determining a direction of movement of the vehicle based upon the determined state of the vehicle and information from the plurality of vehicle sensors.

9 Claims, 15 Drawing Sheets

(56) References Cited

U.S. PATENT DOCUMENTS

| | | | |
|---|---|---|---|
| 6,428,120 | B1 | 8/2002 | Holl |
| 6,513,886 | B1* | 2/2003 | Weber et al. ............... 303/146 |
| 6,539,298 | B2 | 3/2003 | Inagaki et al. |
| 6,564,140 | B2* | 5/2003 | Ichikawa et al. .............. 701/91 |
| 6,577,948 | B1* | 6/2003 | Skellenger et al. .......... 701/408 |
| 6,616,572 | B2* | 9/2003 | Suzuki ........................... 477/86 |
| 6,701,224 | B1 | 3/2004 | Klusemann |
| 6,714,851 | B2* | 3/2004 | Hrovat et al. .................. 701/70 |
| 7,070,247 | B2 | 7/2006 | Offerle |
| 7,096,100 | B2 | 8/2006 | Arata |
| 7,229,139 | B2 | 6/2007 | Lu et al. |
| 7,363,116 | B2 | 4/2008 | Flechtner et al. |
| 7,424,357 | B2 | 9/2008 | Ozaki et al. |
| 7,451,029 | B2 | 11/2008 | McLaren et al. |
| 7,835,840 | B2* | 11/2010 | Chiu et al. ..................... 701/51 |
| 8,065,066 | B2* | 11/2011 | Mori et al. ..................... 701/70 |
| 2003/0130778 | A1* | 7/2003 | Hrovat et al. .................. 701/45 |
| 2004/0024513 | A1* | 2/2004 | Aizawa et al. ................. 701/70 |
| 2004/0215385 | A1* | 10/2004 | Aizawa et al. ................. 701/93 |
| 2005/0209763 | A1 | 9/2005 | Offerle et al. |
| 2006/0149451 | A1* | 7/2006 | Maas ............................. 701/70 |
| 2007/0027598 | A1* | 2/2007 | Mori et al. ..................... 701/41 |
| 2007/0131473 | A1 | 6/2007 | Jonasson et al. |
| 2007/0299581 | A1* | 12/2007 | Torralbo et al. ............... 701/41 |
| 2008/0086269 | A1 | 4/2008 | Joe et al. |
| 2009/0187324 | A1* | 7/2009 | Lu et al. ........................ 701/94 |
| 2010/0036564 | A1* | 2/2010 | Blaise et al. ................... 701/42 |
| 2010/0318255 | A1 | 12/2010 | Li et al. |
| 2011/0276225 | A1* | 11/2011 | Nefcy et al. ................... 701/41 |

FOREIGN PATENT DOCUMENTS

| | | | |
|---|---|---|---|
| EP | 1108605 | 6/2001 | |
| EP | 1327553 A2 * | 7/2003 | ............ B60K 31/00 |
| EP | 1764580 | 3/2007 | |
| FR | 2920732 | 3/2009 | |
| JP | 63038043 | 2/1988 | |
| JP | 0769102 | 3/1995 | |
| JP | 09287962 | 11/1997 | |
| JP | 2000351362 | 12/2000 | |
| JP | 2002083914 | 3/2002 | |
| JP | 2003089350 | 3/2003 | |
| JP | 2004203061 | 7/2004 | |
| JP | 2006296135 | 10/2006 | |
| JP | 2008174102 | 7/2008 | |
| JP | 2008224352 | 9/2008 | |
| JP | 2009126307 | 6/2009 | |
| WO | 2008/003530 | 1/2008 | |
| WO | 2008/113533 | 9/2008 | |

OTHER PUBLICATIONS

"Fuzzylot II . . ." citation above continued: available on IEEE URL: http://ieeexplore.ieee.org/stamp/stamp.jsp?tp=&arnumber=1238515&isnumber=27724.*

EP10165970 European Search Report dated Sep. 3, 2010 (2 pages).

Second Examination Report from the European Patent Office for Application No. 10165970.4 dated Nov. 15, 2011 (4 pages).

Meister, Tilo, et al., "Enabling Technologies for Lateral Dynamic Assistant Systems", SAE Technical Paper Series, document No. 2006-1-1172, 2006 SAE World Congress, Detroit, Michigan, Apr. 3-6, 2006.

Japanese Office Action for Application No. 2010-132849 dated Dec. 17, 2013 (English Translation, 5 pages).

* cited by examiner

DETERMINING LOW-SPEED DRIVING DIRECTION IN A VEHICLE

RELATED APPLICATIONS

The present patent application claims priority to U.S. Provisional Application No. 61/187,568, filed on Jun. 16, 2009, the content of which is hereby incorporated by reference.

BACKGROUND

The present invention relates to determining the direction of travel or movement of a vehicle. More particularly, embodiments of the invention relate to determining vehicle direction in low-speed situations.

SUMMARY

Increasingly sophisticated features are being proposed for modern vehicles, such as automatic parallel parking, and forward/backward emergency braking. In automatic parallel parking systems, forward/backward emergency braking systems, and other vehicle systems, there is a need to know the direction in which a vehicle is traveling. Although vehicle direction can be determined in a number of ways, it is possible to determine the direction of a vehicle using information output by wheel speed sensors. Some intelligent wheel spend sensors must operate for a certain amount of time before there is sufficient data to calculate the direction of movement. During this minimum time, the vehicle must move in a single direction. If the vehicle moves less than is required to obtain needed data, the wheel speed sensor is not able to determine the direction of vehicle movement. If the vehicle repeatedly moves less the required distance (such as might occur during close-quarter maneuvering when the vehicle moves forward and then backward to execute a tight turn), the accumulated distance traveled by the vehicle can reach a significant level, yet because each distinct movement was relatively short, none of the movement was sufficient to allow the direction of movement to be determined. As a consequence, an accumulated error occurs and vehicle systems relying on information from the sensors to determine vehicle direction operate improperly (because they are receiving inaccurate information). These errors can cause improper movement of the vehicle, such as during automatic parallel parking or forward/backward emergency braking maneuvers, which can cause a vehicle to collide with other vehicles or obstacles.

In one embodiment, the invention provides method of determining a driving direction of a vehicle traveling at a low speed. The method includes determining whether the vehicle is in one of three states: (1) an uphill state in which the vehicle is located on an upward sloping surface, (2) a downhill state in which the vehicle is located on a downward sloping surface, and (3) a flat surface state in which the vehicle is located on a flat surface. The method further includes obtaining information from a plurality of vehicle sensors and determining a direction of movement of the vehicle based upon the determined state of the vehicle and information from the plurality of vehicle sensors.

Another embodiment of the invention provides a system for determining a driving direction of a vehicle traveling at a low speed. The system includes a controller, and a plurality of sensors connected to the controller. Each of the sensors configured to transmit information to the controller. A network connects the sensors to the controller. The controller is programmed to determine whether the vehicle is in one of three states: (1) an uphill state in which the vehicle is located on an upward sloping surface, (2) a downhill state in which the vehicle is located on a downward sloping surface, and (3) a flat surface state in which the vehicle is located on a flat surface, and determine a direction of movement of the vehicle based upon the determined state of the vehicle and information from the plurality of sensors.

Other aspects of the invention will become apparent by consideration of the detailed description and accompanying drawings.

DETAILED DESCRIPTION

Figure 1:
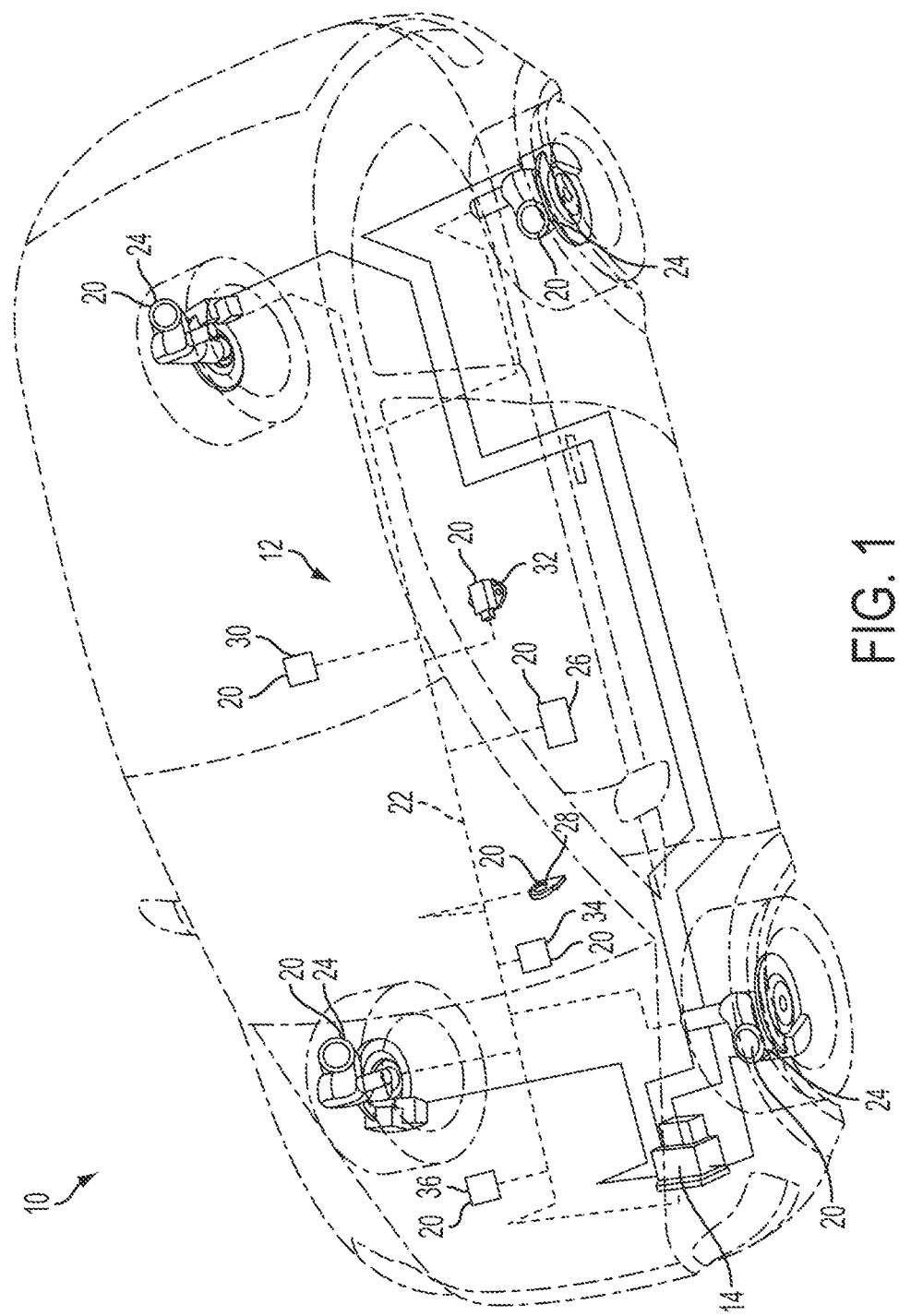
FIG. 1 is a perspective view of a vehicle including a low-speed driving direction detection system according to embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components, may be utilized to implement the invention. As described in subsequent paragraphs, the specific configurations illustrated in the drawings are intended to exemplify embodiments of the invention and other alternative configurations are possible.

FIG. 1 illustrates a vehicle 10 including a low-speed driving direction detection control system 12 according to one embodiment of the invention. As shown in FIG. 1, the low-speed driving direction detection control system 12 includes a controller 14 and a plurality of different types of sensors. In FIG. 1, each sensor is labeled with the reference numeral 20 as well as a second reference numeral. The second reference numerals, which are described in more detail below, provide a specific label to differentiate various types of sensors from one another. The sensors 20 are connected to a network, such as a controller area network ("CAN") bus 22. In the embodiment of FIG. 1, the system 12 includes four wheel speed sensors 24. The wheel speed sensors 24 are standard or non-intelligent sensors. The system 12 also includes a longitudinal acceleration sensor 26; a steering angle sensor 28; a lateral acceleration sensor 30; a yaw rate sensor 32; a brake light switch 34; and a gearshift sensor or indicator 36. It should be understood that in some embodiments other types of sensors 20 can be included in the system 12. In addition, the arrangement and positions of the sensor 20 shown in FIG. 1 is for illustrative purposes only.

Figure 2:
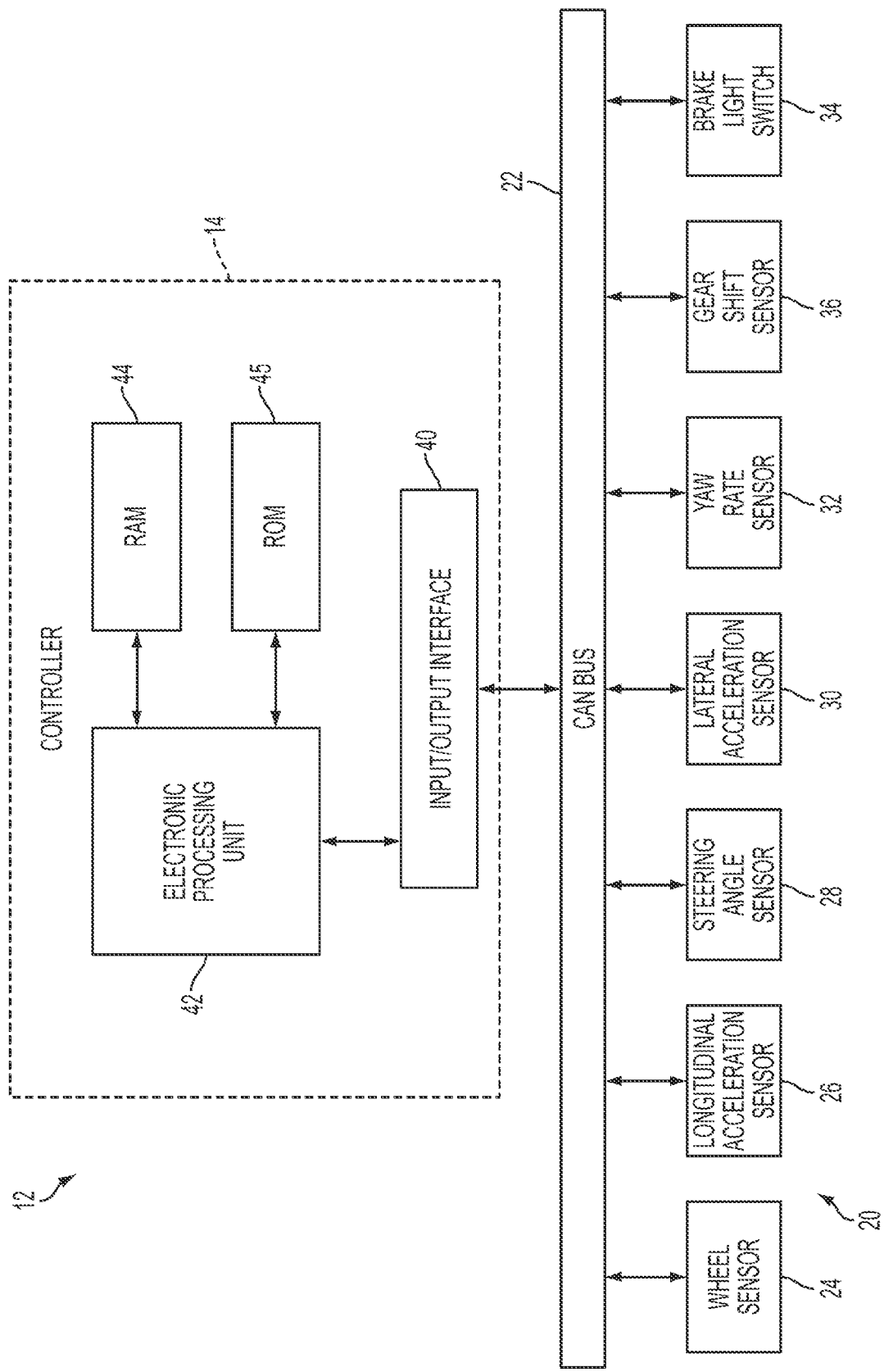
FIG. 2 schematically illustrates the low-speed driving direction detection system of FIG. 1 according to one embodiment of the invention.

FIG. 2 schematically illustrates the low-speed driving direction detection control system 12 of FIG. 1 in greater detail. As shown in FIG. 2, the control system 12 includes the controller 14, the one or more sensors 20, and the bus 22. In some embodiments, the controller 14 obtains sensor readings directly from one or more of the sensors 20 rather than over the bus 22. In some circumstances, compensated sensor readings are used by the controller 14, rather than raw data. For example, in some circumstances, the controller 14 compensates one or more of the sensor readings by applying an offset. Offsets are used to compensate for sensor aging, fouling, and other signal corruption that may occur.

As shown in FIG. 2, the controller 14 includes an input/output interface 40, an electronic processing unit ("EPU") 42, and one or more memory modules, such as a random access memory ("RAM") 44 and read-only memory ("ROM") 45. The input/output interface 40 transmits and/or receives information over the bus 22, including sensor readings from the sensors 20.

The EPU 42 receives the information from the input/output interface 40 and processes the information by executing one or more applications or modules. The applications or modules are stored in memory, such as ROM 45. The EPU 42 stores information (e.g., information received from the bus 22 or information generated by applications or modules executed by the EPU 42) to the RAM 44.

Figure 3:
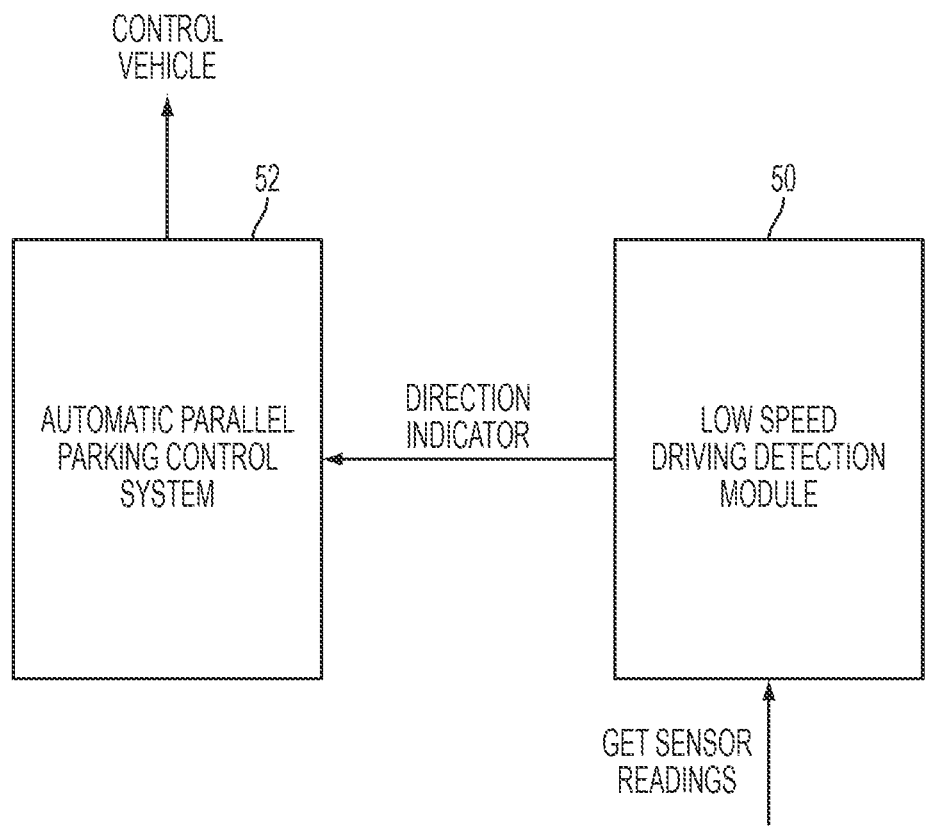
FIG. 3 schematically illustrates the functional operation of modules of the low-speed driving direction detection system of FIG. 2 according to one embodiment of the invention.

FIG. 3 illustrates the operation of a low-speed driving direction detection ("LSDDD") module 50 (which is executed by the EPU 42 of the controller 14). The LSDDD module 50 receives sensor signals from at least some of the sensors 20 over the bus 22 (e.g., through the input/output interface 40) and determines a direction of the vehicle 10. The LSDDD module 50 outputs a direction indicator based on the determined direction. In some embodiments, before the LSDDD module 50 determines a direction the vehicle 10 is moving, the module 50 outputs an "unknown" or "undetermined" direction indicator.

In the example shown in FIG. 3, EPU 42 also executes an automatic parallel parking control application or module 52. The automatic parallel parking control module 52 receives the direction indicator from the LSDDD module 50 and controls the vehicle 10 (e.g., controls the steering of the vehicle 10 and displays operating instructions to the vehicle operator) to perform a parallel parking maneuver.

FIGS. 4-15 illustrate low-speed driving direction methods performed by the LSDDD module 50. In the particular embodiment illustrated, the LSDDD module 50 is architected to handle three different vehicle situations: (1) the vehicle is located on an upward sloping surface (the "uphill case"); (2) the vehicle is located on a downward sloping surface (the "downhill case"); and (3) the vehicle is located on a flat surface (the "flat surface case"). In each of these cases, it is assumed that the vehicle is initially stopped or standing still and then moves. The LSDDD module 50 then determines the direction of movement. Each of these cases is described individually, but in practice the system 12 can be configured such that it first determines the current vehicle situation (i.e., the "uphill case," the "downhill case," or the "flat surface case") and then carries out the methodology associated with the determined situation. In the examples shown and described, it is assumed that the vehicle is equipped with an automatic transmission with selections for "park" or "P," "reverse" or "R," "neutral" or "N," "drive" or "D," and "low" or "L." In the description that follows, common short hand, such as "put the vehicle in drive," will be used to indicate that the driver has made a transmission selection.

FIGS. 4-7 illustrate low-speed driving direction detection methods for the uphill case. In general, when a vehicle is positioned on an upwardly sloping surface, the longitudinal acceleration sensor 26 outputs a positive reading due to the angle of the vehicle. Since it is rare to encounter a surface that is perfectly flat, the LSDDD module 50 distinguishes slightly sloped surfaces from more severely sloped surfaces using a number of empirically determined thresholds. The uphill case is assumed only when or if the reading from the longitudinal acceleration sensor 26 is greater than a predetermined uphill threshold. Depending on the incline of the upward sloping surface, the vehicle 10 may initially free-roll backward when the vehicle 10 is placed in "drive" before it moves forward as a result of the driver pressing the accelerator pedal. As described below in more detail, by monitoring (1) the difference of the readings or output of the longitudinal acceleration sensor between the time the vehicle is at a standstill and the time the vehicle is free-rolling backward, (2) the value of the sensor readings from the wheel speed sensors, (3) the zero-crossing point of sensor readings from the wheel speeds, (4) the sensor readings from the steering angle sensor, (5) the sensor readings from the lateral acceleration sensor, and (6) the sensor readings form the yaw rate sensor, the LSDDD module 50 determines the direction of vehicle movement.

Figure 4:
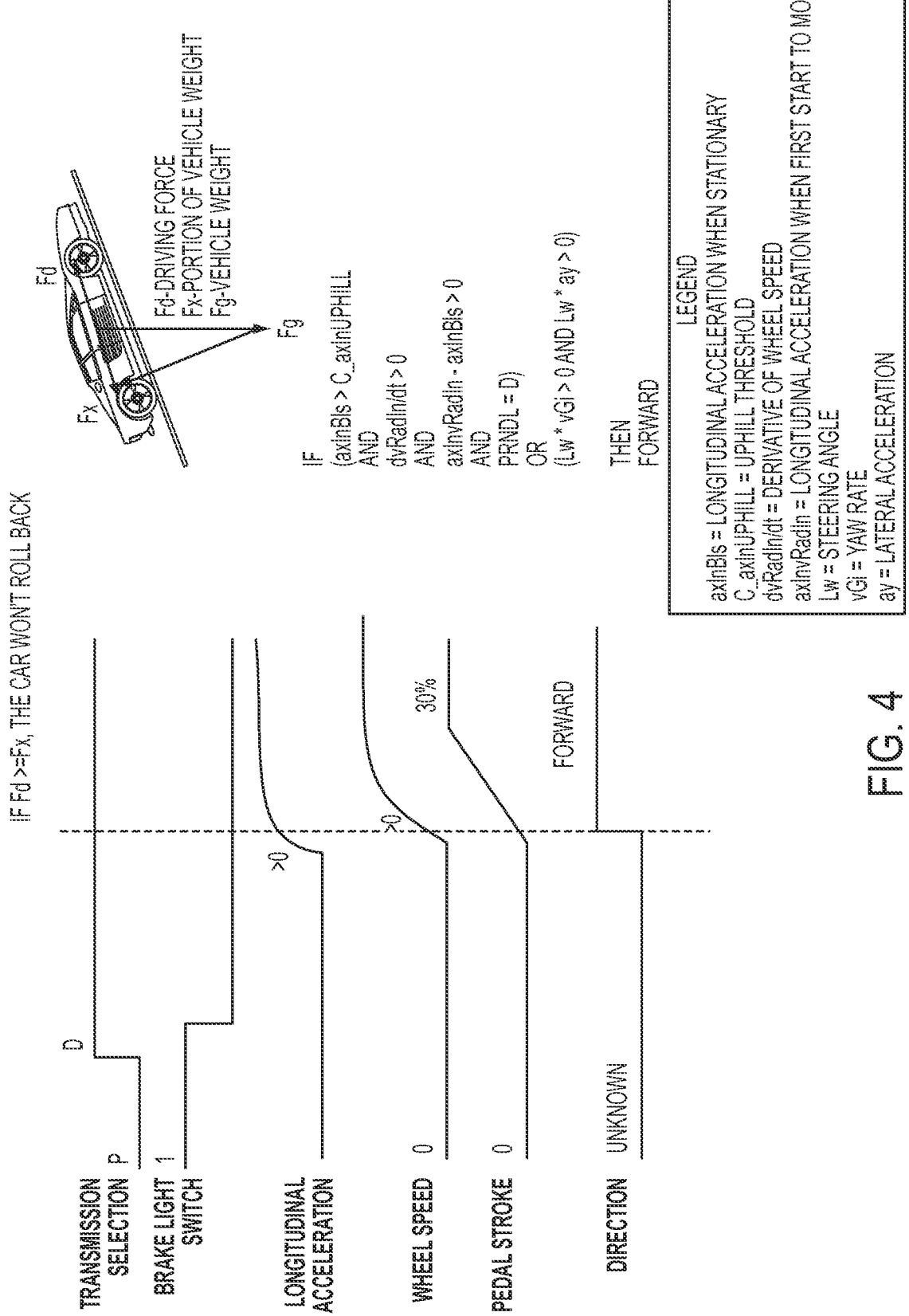
FIG. 4 illustrates a low-speed driving direction detection method for determining a vehicle's direction in an uphill case based on whether the vehicle's driving force is greater than or equal to a portion of the vehicle's weight according to one embodiment of the invention.

FIG. 4 illustrates a circumstance in which the driving force of the vehicle (generated by the vehicle's engine at idle), is greater than or equal to a portion of the vehicle's weight which would, in the absence of a counter force, cause the vehicle to roll backwards. In this situation, the vehicle 10 does not roll backward even when a vehicle operator takes his or her foot off of the vehicle's brake pedal (i.e., the vehicle's idle torque holds the vehicle in its current position).

The operations of LSDDD module 50 may be modeled with or represented by an if-then statement. The method of FIG. 4 generally includes the following logic:

If ( (1a) the vehicle is on an upward sloping surface AND
 (2a) the vehicle is accelerating AND
 (3a) the longitudinal acceleration of the vehicle at the time it starts to move minus the longitudinal acceleration of the vehicle when it is substantially stationary is greater than zero AND
 (4a) the vehicle is in "drive")
OR
( (1b) the vehicle's steering angle multiplied by the vehicle's yaw rate is greater than zero AND
 (2b) the vehicle's steering angle multiplied by the vehicle's lateral acceleration is greater than zero)
THEN, the vehicle is moving forward.

Breaking down the method of FIG. 4, step (1a) includes determining whether a sensor reading from the vehicle's longitudinal acceleration sensor 26 when the vehicle is substantially stationary (e.g., when the brake light switch 34 is engaged) (axlnBls) is greater than a predetermined uphill threshold (C_axlnUpHill). Step (2a) includes determining whether the derivative of current reading from the wheel speed sensor(s) 24 (dvRadln/dt) is greater than zero. (Taking the derivative of speed yields the acceleration of the vehicle.) Therefore, step (2a) determines whether the vehicle's current acceleration is greater than zero.

Step (3a) includes determining whether the reading or output from the longitudinal acceleration sensor 26 when the vehicle 10 first starts to move (axlnvRadln) minus the reading from the longitudinal acceleration sensor 26 when the vehicle 10 is substantially stationary is greater than zero.

Evaluating whether the vehicle is moving may be accomplished by analyzing readings from the wheel speed sensors 24 over a period of cycles or polls. For example, if three successive readings indicate that the wheel speed is increasing then it can be assumed that the vehicle is moving. Step (3a) determines whether the vehicle's drive force (or its longitudinal acceleration once the vehicle starts to move) is great enough to overcome the weight or force of gravity pulling the vehicle down the upward sloping surface. In FIG. 4, this force is shown as "Fx." If it is, the vehicle 10 moves forward without first rolling backward. As described below with respect to FIGS. 5 and 6, if the vehicle's driving force (its longitudinal acceleration) is not greater than the force pulling the vehicle down the upward sloping surface, the vehicle 10 rolls backward before it can move forward (e.g., before the vehicle's drive torque or force is greater than the force Fx).

Finally, in step (4a) the output from the gear shift sensor 36 (PRNDL) is evaluated. It is assumed that when the vehicle's transmission is in "drive" or "D," the vehicle is moving forward or at least the intended movement is forward. Thus, "PRNDL=D" is yet another factor indicating that forward movement is occurring. If the LSDDD module 50 determines that all of the steps (1a) through (4a) are satisfied, the LSDDD module 50 outputs a direction indicator indicating that the vehicle 10 is moving in a forward direction.

As shown in FIG. 4, the LSDDD module 50 can also use sensor readings from the vehicle's steering angle sensor 28, yaw rate sensor 32, and lateral acceleration sensor 30 to determine whether the vehicle 10 is moving in a forward direction (see steps (1b) and (2b)). Step (1b) includes determining whether the reading from the vehicle's steering angle sensor 28 multiplied by the reading from the vehicle's yaw rate sensor 32 is greater than zero. Step (2b) includes determining whether the reading from the vehicle's steering angle sensor 28 multiplied by the reading from the vehicle's lateral acceleration sensor 30 is greater than zero. If the LSDDD module 50 determines that both steps (1b) and (2b) are satisfied, the LSDDD module 50 outputs a direction indicator indicating that the vehicle 10 is moving in a forward direction.

Figure 5:
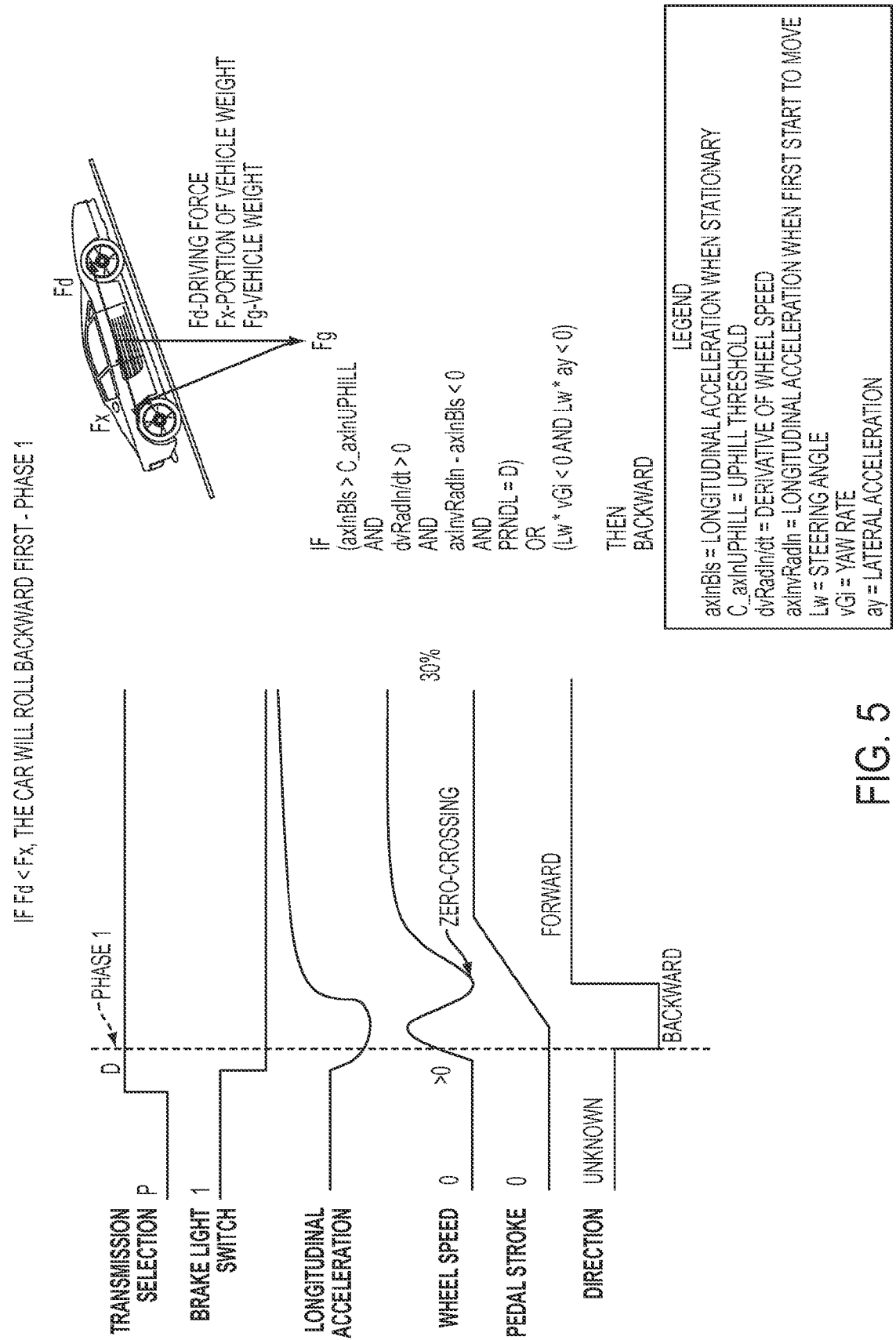
FIG. 5 illustrates phase 1 of a low-speed driving direction detection method for determining a vehicle's direction in an uphill case based on whether the vehicle's driving force is less than a portion of the vehicle's weight according to one embodiment of the invention.
Figure 6:
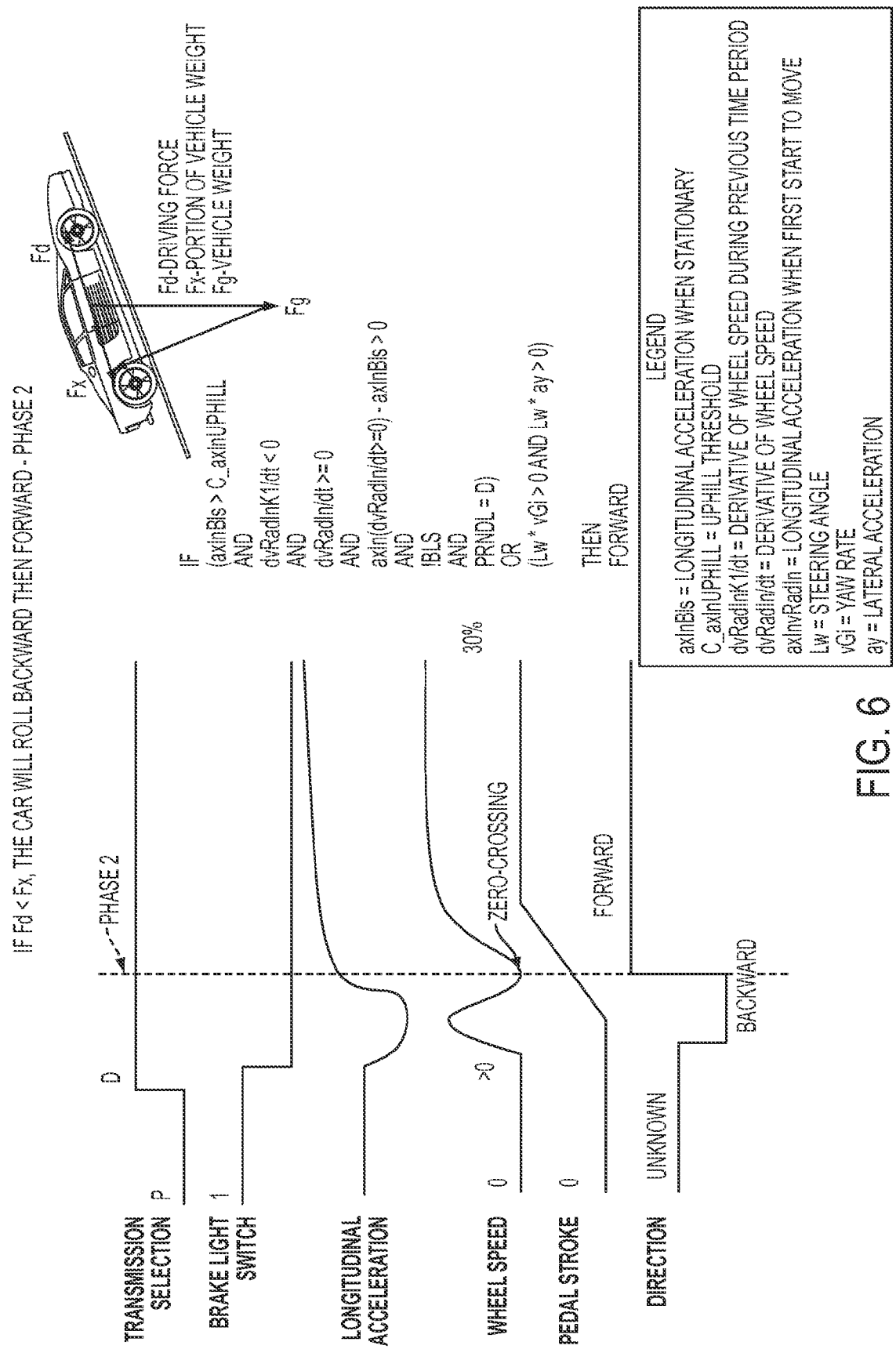
FIG. 6 illustrates phase 2 of the low-speed driving direction detection method of FIG. 5 according to one embodiment of the invention.

FIGS. 5 and 6 illustrate two phases of the uphill case. In the phase shown in FIG. 5, the vehicle 10 initially rolls backward when a vehicle operator takes his or her foot off of the vehicle's brake pedal (i.e., the vehicle's idle torque cannot hold the vehicle in its current position) but then moves forward as a result of the vehicle operator pressing the accelerator pedal. Therefore, this situation includes two phases. FIG. 5 illustrates logic for phase 1, which detects if the vehicle is free-rolling backward before driving forward. The general logic for phase 1 follows:

If ( ( (1a) the vehicle is on an upward sloping surface AND
 (2a) the vehicle is accelerating AND
 (3a) the longitudinal acceleration of the vehicle at the time it starts to move minus the longitudinal acceleration of the vehicle when it is substantially stationary is less than zero AND
 (4a) the vehicle is in "drive"
 )
OR
( (1b) the vehicle's steering angle multiplied by the vehicle's yaw rate is less than zero AND
 (2b) the vehicle's steering angle multiplied by the vehicle's lateral acceleration is less than zero
 )
)
THEN, the vehicle is moving backward.

Breaking down the logic of FIG. 5, step (1a) includes determining whether a sensor reading from the vehicle's longitudinal acceleration sensor 26 when the vehicle is substantially stationary is greater than the predetermined uphill threshold. Step (2a) includes determining whether the derivative of current sensor readings from the vehicle's wheel speed sensor(s) 24 is greater than zero. Step (3a) includes determining whether output from the longitudinal acceleration sensor 26 when the vehicle 10 first starts to move minus the reading from the longitudinal acceleration sensor 26 when the vehicle 10 is substantially stationary is less than zero. Finally, in step (4a) the reading from the gear shift sensor 36 is evaluated to determine if the vehicle's transmission is in "drive." If the LSDDD module 50 determines that all of the steps (1a) through (4a) are satisfied, the LSDDD module 50 outputs a direction indicator (e.g., to the automatic parallel parking control module 52) indicating that the vehicle 10 is moving in a backward direction.

As shown in FIG. 5, the logic in phase 1 can alternatively use sensor readings from the vehicle's steering angle sensor 28, yaw rate sensor 32, and lateral acceleration sensor 30 to determine whether the vehicle 10 is moving backward (see steps (1b) and (2b)). If the LSDDD module 50 determines that both steps (1b) and (2b) are satisfied, the LSDDD module 50 outputs a direction indicator (e.g., to the automatic parallel parking control module 52) indicating that the vehicle 10 is moving in a backward direction.

FIG. 6 illustrates logic for phase 2, which detects if the vehicle is driving forward after initially free-rolling backward. The general logic for phase 2 follows:

of readings from the vehicle's wheel speed sensors 24 is zero (dvRadln/dt=0), indicating that the vehicle 10 is stationary. After the zero-crossing point, the vehicle's speed increases (dvRadln/dt>0) as the vehicle 10 begins to move forward.

Steps (5a) and (6a) evaluate the vehicle's brake light switch 34 and the vehicle's gear shift sensor 36. It is assumed that when the operator's foot is off the brake and the vehicle's transmission is in "drive," the vehicle is moving forward or at least the intended movement is forward. Thus, "!BLS" and "PRNDL=D" are two additional factors indicating that forward movement is occurring. If the LSDDD module 50 determines that all of the steps (1a) through (6a) are satisfied, the LSDDD module 50 outputs a direction indicator (e.g., to the automatic parallel parking control module 52) indicating that the vehicle 10 is moving in a forward direction.

---

If ( ( (1a) the vehicle is on an upward sloping surface AND
       (2a) the vehicle was decelerating during a previous time period AND
       (3a) the vehicle's current acceleration is greater than or equal to zero AND
       (4a) the longitudinal acceleration of the vehicle at any time after the
            vehicle's wheels change from rotating backward to rotating forward minus
            the longitudinal acceleration of the vehicle when it is substantially
            stationary is greater than zero AND
       (5a) the vehicle's brake light switch is not engaged AND
       (6a) the vehicle is in "drive"
     )
     OR
     ( (1b) the vehicle's steering angle multiplied by the vehicle's yaw rate is
            greater than zero AND
       (2b) the vehicle's steering angle multiplied by the vehicle's lateral
            acceleration is greater than zero
     )
)
THEN, the vehicle is moving forward.

---

Breaking down the method of FIG. 6, step (1a) includes determining whether a sensor reading from the vehicle's longitudinal acceleration sensor 26 when the vehicle is substantially stationary is greater than the predetermined uphill threshold. Step (2a) includes determining whether the derivative of the output from the wheel speed sensors 24 during a previous time period (dvRadlnK1/dt) is less than zero. Because the derivative of speed yields acceleration, step (2a) determines whether the vehicle was decelerating during a previous time period. Similarly, step (3a) determines whether the vehicle is currently accelerating. It is assumed that the vehicle decelerates as it initially free-rolls backward before coming to a stop and driving forward, as intended by the vehicle operator. Therefore, steps (2a) and (3a) determine whether the vehicle was previously decelerating or stopped and is now accelerating.

Step (4a) includes determining whether the vehicle's longitudinal acceleration at or after the vehicle's zero-crossing point (axln(dvRadln/dt>=0)) minus the vehicle's longitudinal acceleration sensor 26 when the vehicle 10 is substantially stationary (axlnBls) is greater than zero. As shown in FIG. 6, the vehicle's zero-crossing point occurs when the vehicle stops after free-rolling backward and before moving forward. Therefore, the zero-crossing point occurs when the derivative As shown in FIG. 6, the logic in phase 2 can alternatively use sensor readings from the vehicle's steering angle sensor 28, yaw rate sensor 32, and lateral acceleration sensor 30 to determine whether the vehicle 10 is moving in forward (see steps (1b) and (2b)). If the LSDDD module 50 determines that both steps (1b) and (2b) are satisfied, the LSDDD module 50 outputs a direction indicator indicating that the vehicle 10 is moving in a backward direction.

Figure 7:
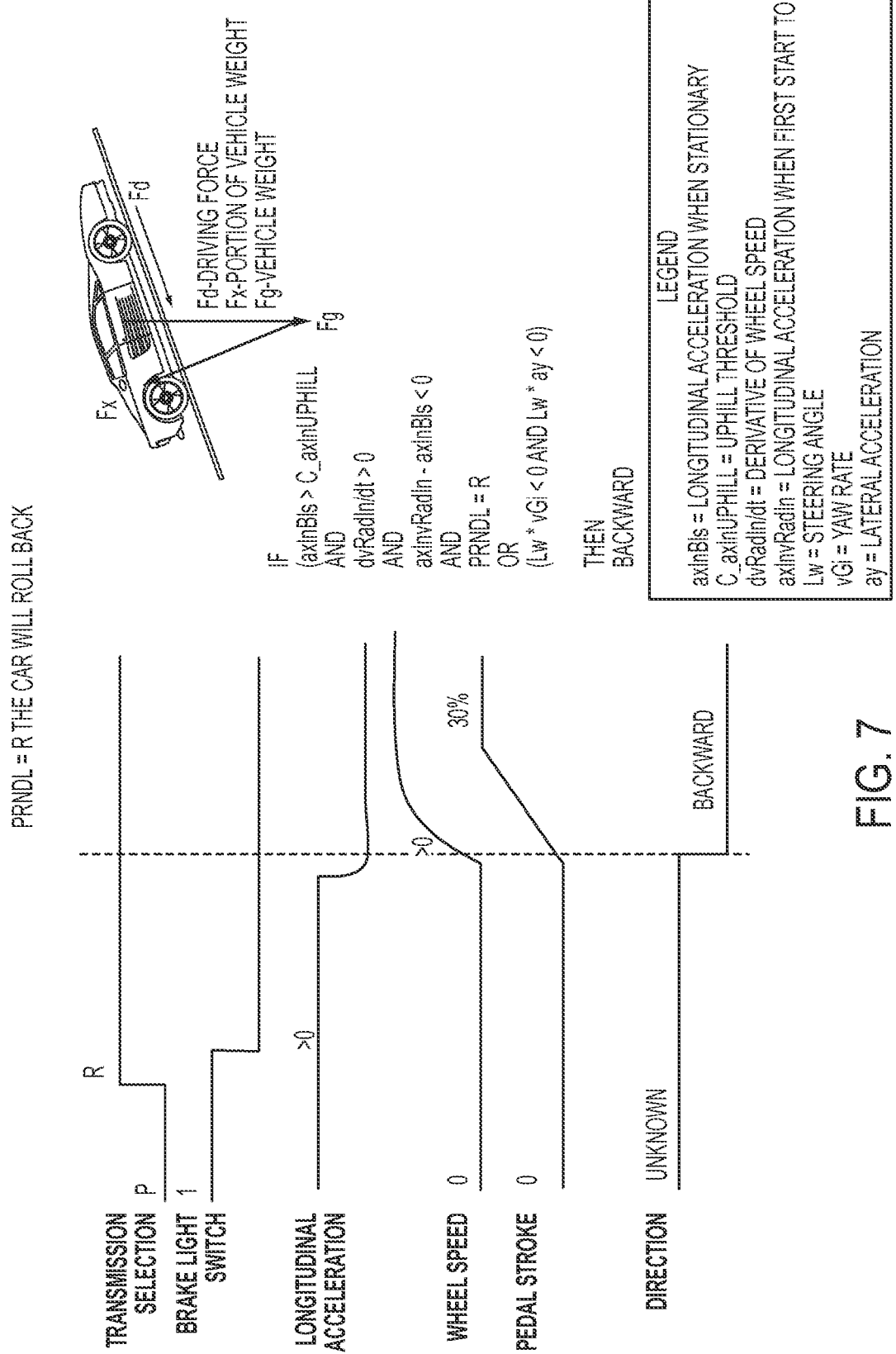
FIG. 7 illustrates a low-speed driving direction detection method for determining a vehicle's direction in an uphill case based on whether the vehicle's transmission is in reverse according to one embodiment of the invention.

FIG. 7 illustrates the uphill case in which the vehicle's transmission is in "reverse" or "R." In this situation, because the vehicle is on an incline and the vehicle's intended movement is backward, the vehicle 10 moves backward. The operations of the LSDDD module 50 in this situation may be represented by an if-then statement. The logic generally involves determining whether the vehicle is on an upward sloping surface and then monitoring various vehicle conditions, such as speed and acceleration. If all the conditions are met, the LSDDD module 50 outputs a signal indicating that the vehicle is moving backward.

The operations of LSDDD module 50 in this situation may be modeled with or represented by an if-then statement. The method of FIG. 7 generally includes the following logic:

---

If ( ( (1a) the vehicle is on an upward sloping surface AND
       (2a) the vehicle is accelerating AND
       (3a) the longitudinal acceleration of the vehicle at the time it starts to
            move minus the longitudinal acceleration of the vehicle when it is
            substantially stationary is less than zero AND
       (4a) the vehicle is in "reverse"

)

```
    OR
    (    (1b) the vehicle's steering angle multiplied by the vehicle's yaw rate is
         less than zero AND
         (2b) the vehicle's steering angle multiplied by the vehicle's lateral
         acceleration is less than zero
    )
)
THEN, the vehicle is moving backward.
```

Breaking down the method of FIG. 7, step (1a) includes determining whether a sensor reading from the vehicle's longitudinal acceleration sensor 26 when the vehicle is substantially stationary is greater than the predetermined uphill threshold, and step (2a) includes determining whether the derivative of current sensor readings from the vehicle's wheel speed sensors 24 is greater than zero. Step (3a) includes determining whether the vehicle's longitudinal acceleration when the vehicle 10 first starts to move minus the vehicle's longitudinal acceleration when the vehicle 10 is substantially stationary is less than zero. Finally, step (4a) determines whether the gear shift sensor 36 indicates that the vehicle's transmission is in "reverse." If the LSDDD module 50 determines that all of the steps (1a) through (4a) are satisfied, the LSDDD module 50 outputs a direction indicator indicating that the vehicle 10 is moving in a backward direction.

As shown in FIG. 7, the logic can alternatively use sensor readings from the vehicle's steering angle sensor 28, yaw rate sensor 32, and lateral acceleration sensor 30 to determine whether the vehicle 10 is moving in forward (see steps (1b) and (2b)). If the LSDDD module 50 determines that both steps (1b) and (2b) are satisfied, the LSDDD module 50 outputs a direction indicator indicating that the vehicle 10 is moving in a backward direction.

FIGS. 8-11 illustrate low-speed driving direction detection methods for the downhill case. In general, when a vehicle is positioned on a downward sloping surface, the longitudinal acceleration sensor 26 outputs a negative reading due to the angle of the vehicle. Similar to the uphill case, because it is rare to encounter a surface that is perfectly flat, the LSDDD module 50 distinguishes between slightly sloped surfaces and more severely sloped surfaces using various thresholds. For the downhill case, the LSDDD uses a predetermined downhill threshold (C_axlnDownhill). The downhill case is assumed when the reading from the longitudinal acceleration sensor 26 is greater than the predetermined downhill threshold. Because the longitudinal acceleration of the vehicle is negative in the downhill case, the LSDDD module 50 may determine whether the vehicle's longitudinal acceleration is less than the negative value of the downhill threshold.

Depending on the decline of the downward sloping surface, the vehicle 10 may initially free-roll forward when the vehicle is placed in "reverse" before it moves backward as a result of the driver pressing the accelerator pedal. As described below in more detail, by monitoring (1) the difference of the sensor readings of the longitudinal acceleration sensor between the time the vehicle is at a standstill and the time the vehicle is free-rolling forward, (2) the value of the sensor readings from the wheel speed sensors, (3) the zero-crossing point of sensor readings from the wheel speeds, (4) the sensor readings from the steering angle sensor, (5) the sensor readings from the lateral acceleration sensor, and (6) the sensor readings form the yaw rate sensor, the LSDDD module 50 determines the direction of vehicle movement.

Figure 8:
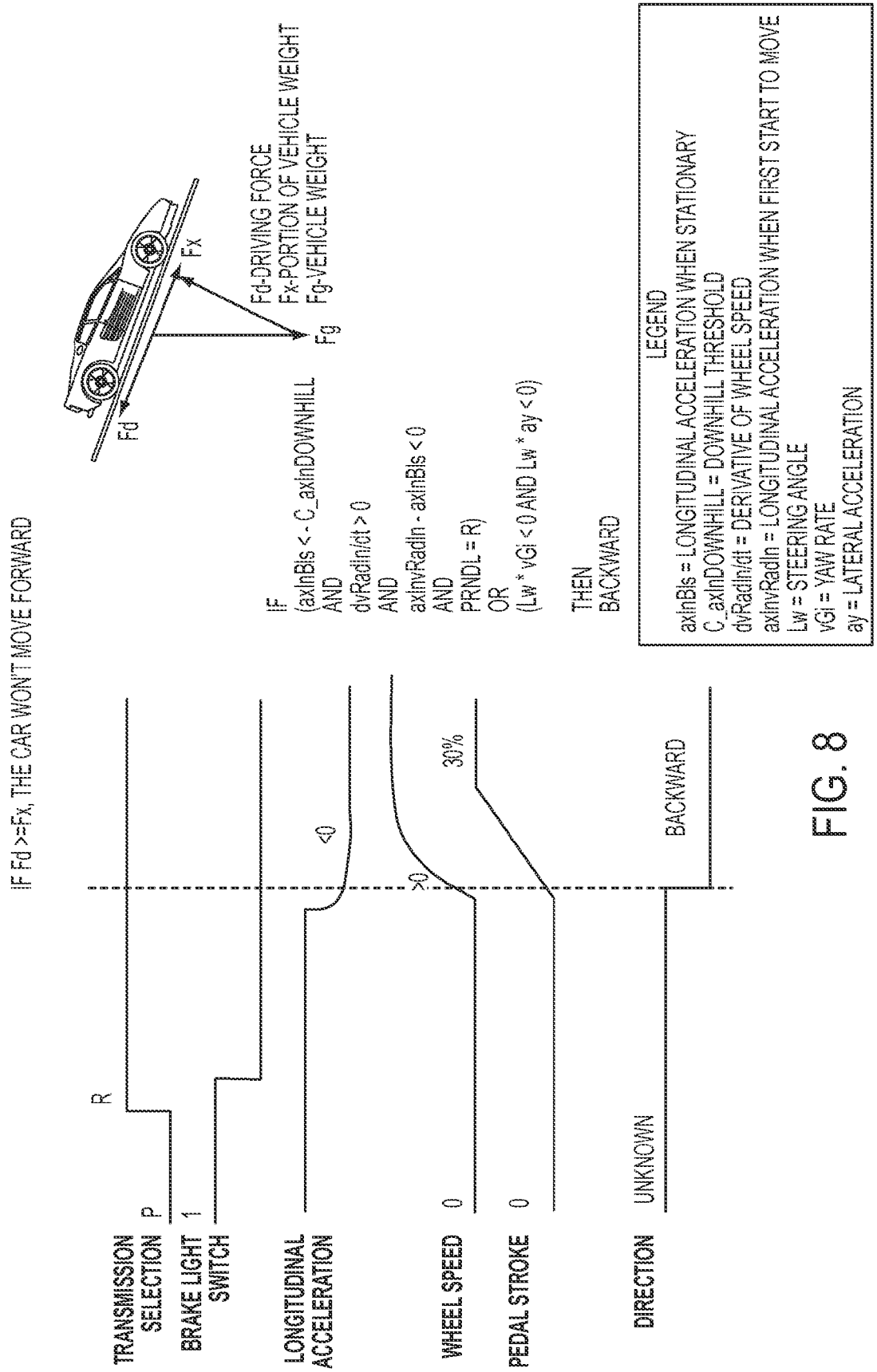
FIG. 8 illustrates a low-speed driving direction detection method for determining a vehicle's direction in a downhill case based on whether the vehicle's driving force is greater than or equal to a portion of the vehicle weight according to one embodiment of the invention.
Figure 9:
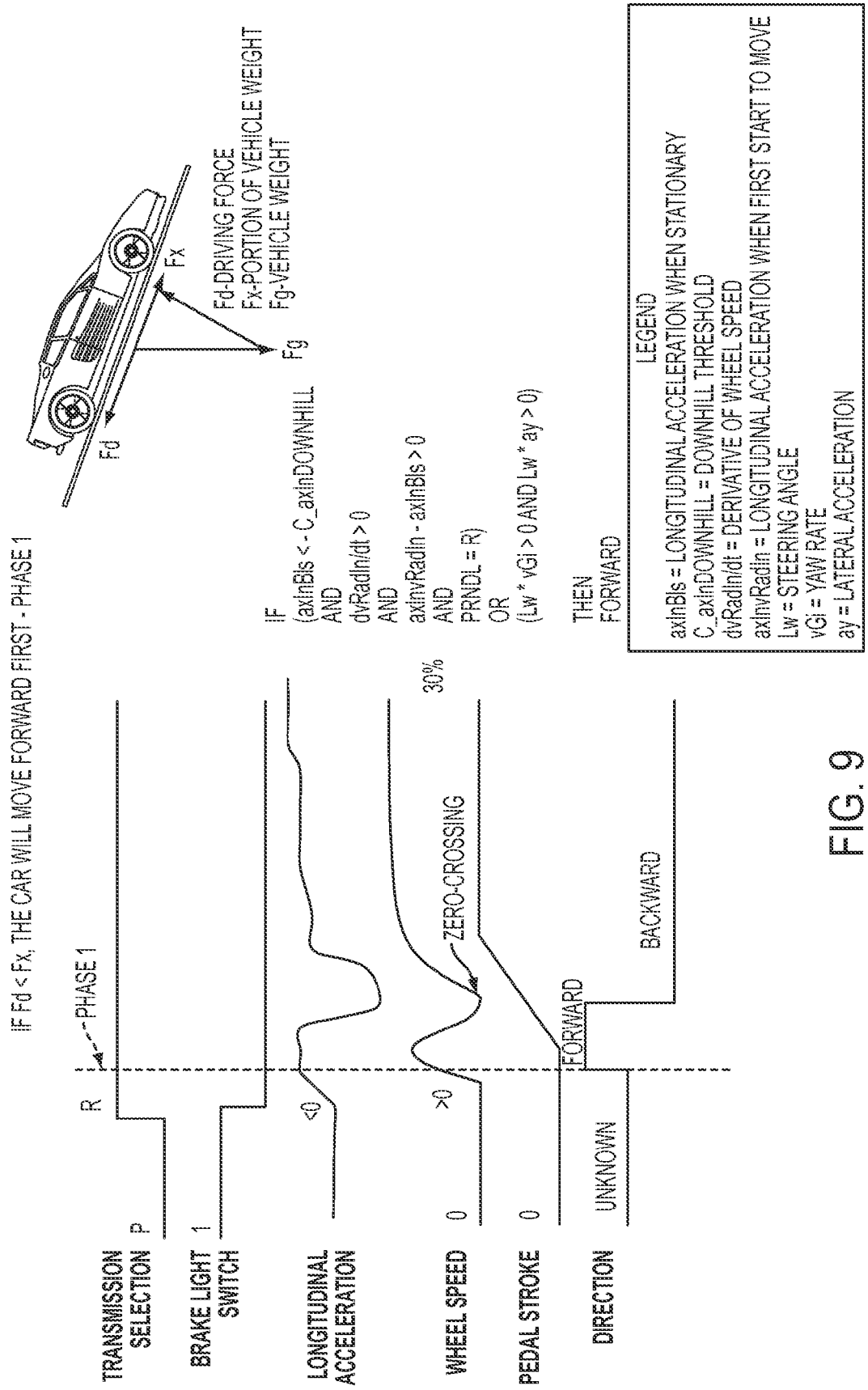
FIG. 9 illustrates phase 1 of a low-speed driving direction detection method for determining a vehicle's direction in a downhill case based on whether the vehicle's driving force is less than a portion of the vehicle weight according to one embodiment of the invention.
Figure 10:
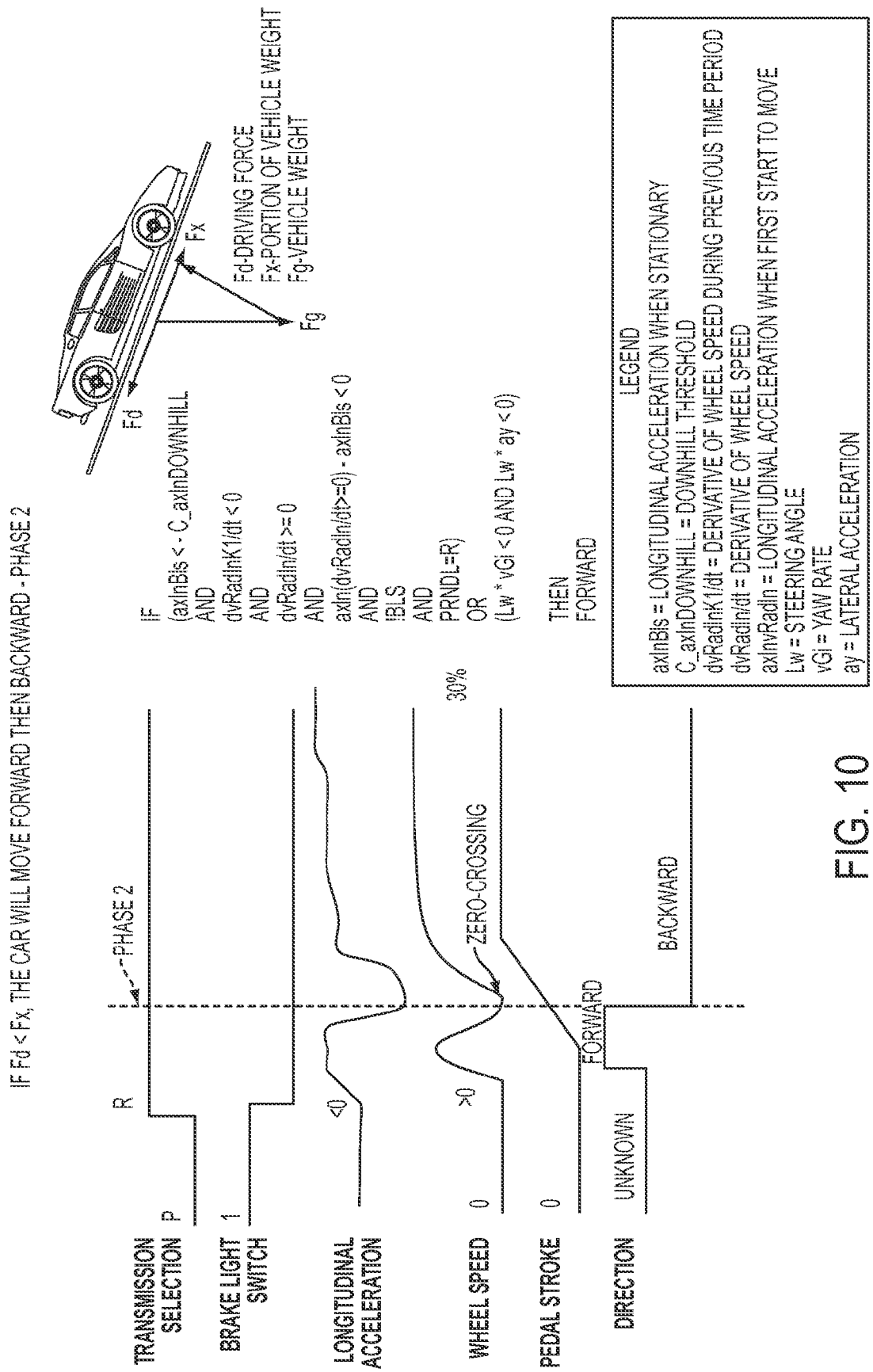
FIG. 10 illustrates phase 2 of the low-speed driving direction detection method of FIG. 9 according to one embodiment of the invention.
Figure 11:
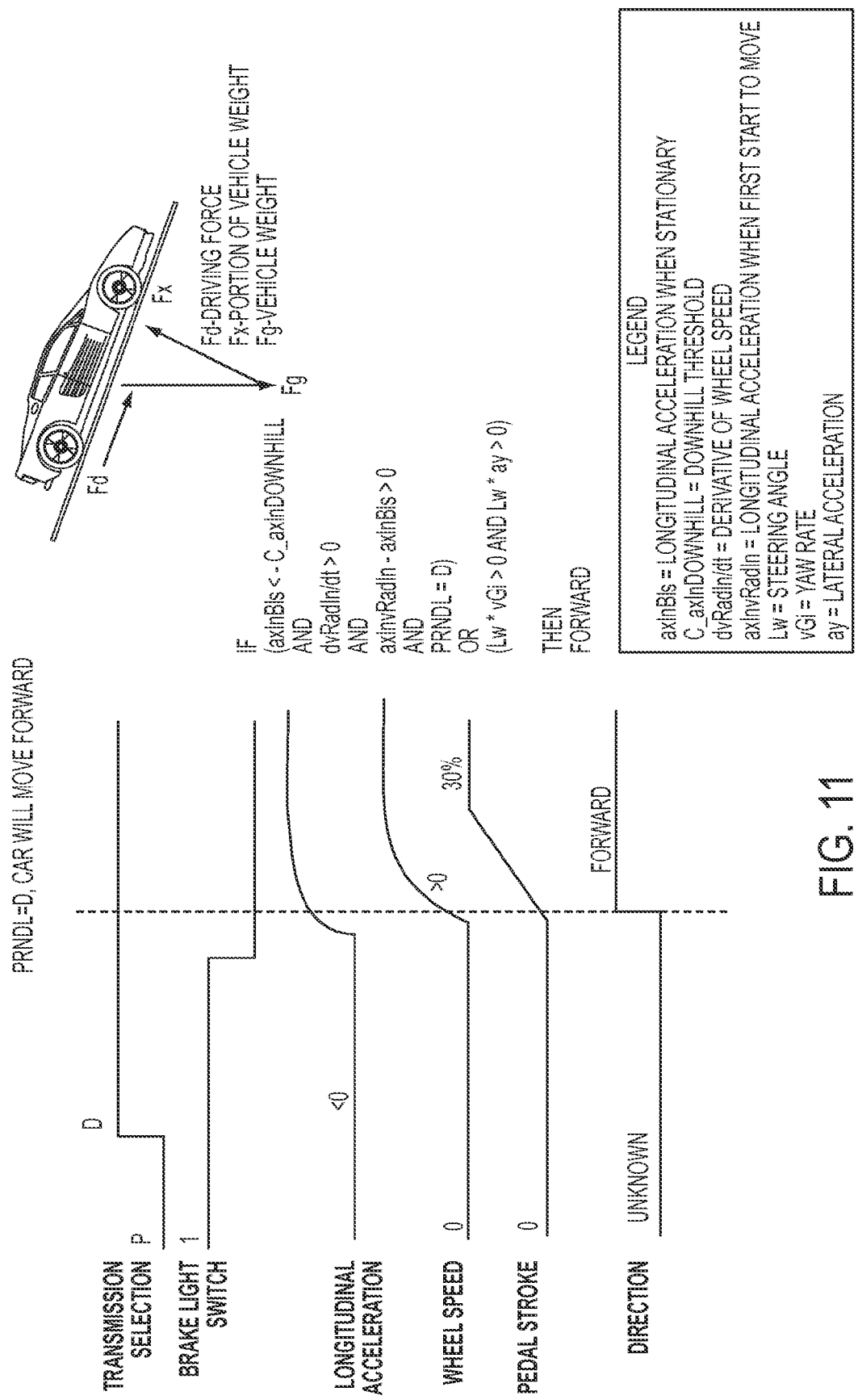
FIG. 11 illustrates a low-speed driving direction method for determining a vehicle's direction in a downhill case based on whether the vehicle's transmission is in drive.

FIG. 8 illustrates a circumstance in the downhill case in which the driving force of the vehicle is greater than or equal to a portion of the vehicle's weight, which would, in the absence of a counter force, cause the vehicle to roll forward. In this situation, the vehicle 10 does not roll forward even when a vehicle operator takes his or her foot off of the vehicle's brake pedal (i.e., the vehicle's idle torque holds the vehicle in its current position). FIGS. 9 and 10 illustrate an opposite circumstance in the downhill case in which the driving force of the vehicle is less than a portion of the vehicle's weight. In this situation, the vehicle 10 initially rolls forward when a vehicle operator takes his or her foot off of the brake pedal and then moves backward as a result of the driver pressing the accelerator pedal. FIG. 11 illustrates another circumstance in the downhill case in which the vehicle's transmission is in "drive," which causes the vehicle to move forward down the declined. The logic executed in the situations of FIGS. 8-11 is similar to and uses similar labels and functions as the logic of FIGS. 4-7. Therefore, the particular details of FIGS. 8-11 are not described in detail.

FIGS. 12-15 illustrate low-speed driving direction detection methods for the flat surface case. In general, when a vehicle positioned on a generally flat surface, the vehicle's longitudinal acceleration sensor 26 outputs a zero or small value because the vehicle is generally horizontal. Because it is rare to encounter a perfectly flat surface, the LSDDD module distinguishes a generally flat surface from a sloped surface using two thresholds (C_axlnUpHill, C_axlnDownhill). The flat surface case is assumed only when the reading from the vehicle's longitudinal acceleration sensor 26 is between the predetermined uphill threshold and the predetermined downhill threshold.

In the flat surface case, the vehicle initially free-rolls forward when the vehicle's transmission is shifted from "drive" to "reverse" due to the vehicle's forward inertia. Similarly, the vehicle initially free-rolls backward when the vehicle's transmission is shifted from "reverse" to "drive" due to the vehicle's backward inertia. As described below in more detail, by monitoring (1) the difference of the sensor readings of the longitudinal acceleration sensor between the time the vehicle is at a standstill and the time the vehicle is free-rolling forward or backward, (2) the value of the sensor readings from the wheel speed sensors, (3) the zero-crossing point of sensor readings from the wheel speeds, (4) the sensor readings from the steering angle sensor, (5) the sensor readings from the lateral acceleration sensor, and (6) the sensor readings form the yaw rate sensor, the LSDDD module 50 determines the direction the vehicle is moving on the generally flat surface.

Figure 12:
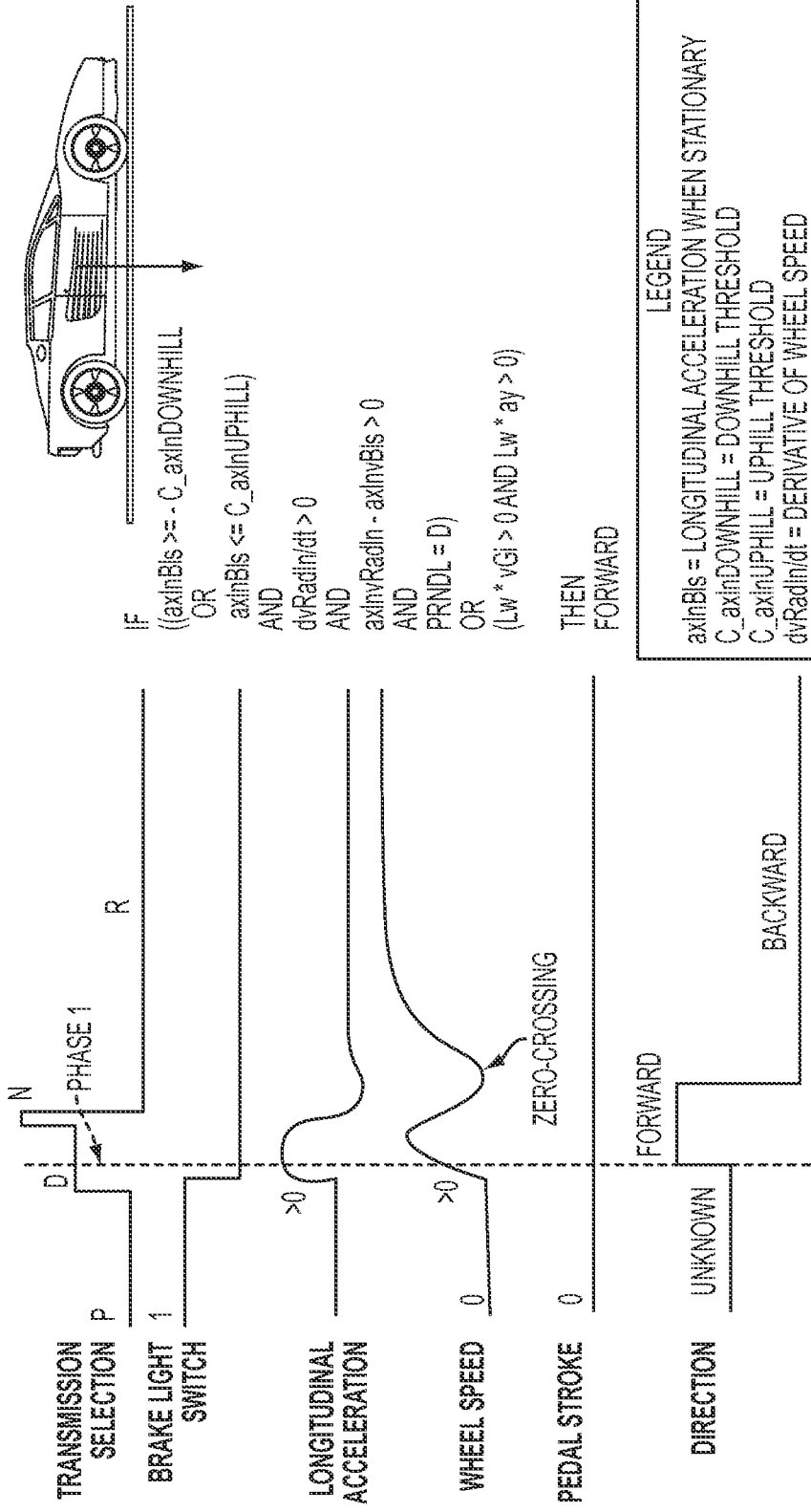
FIG. 12 illustrates phase 1 of a low-speed driving direction detection method for determining a vehicle's direction in a flat surface case based on whether the vehicle's transmission shifts from drive to reverse.
Figure 13:
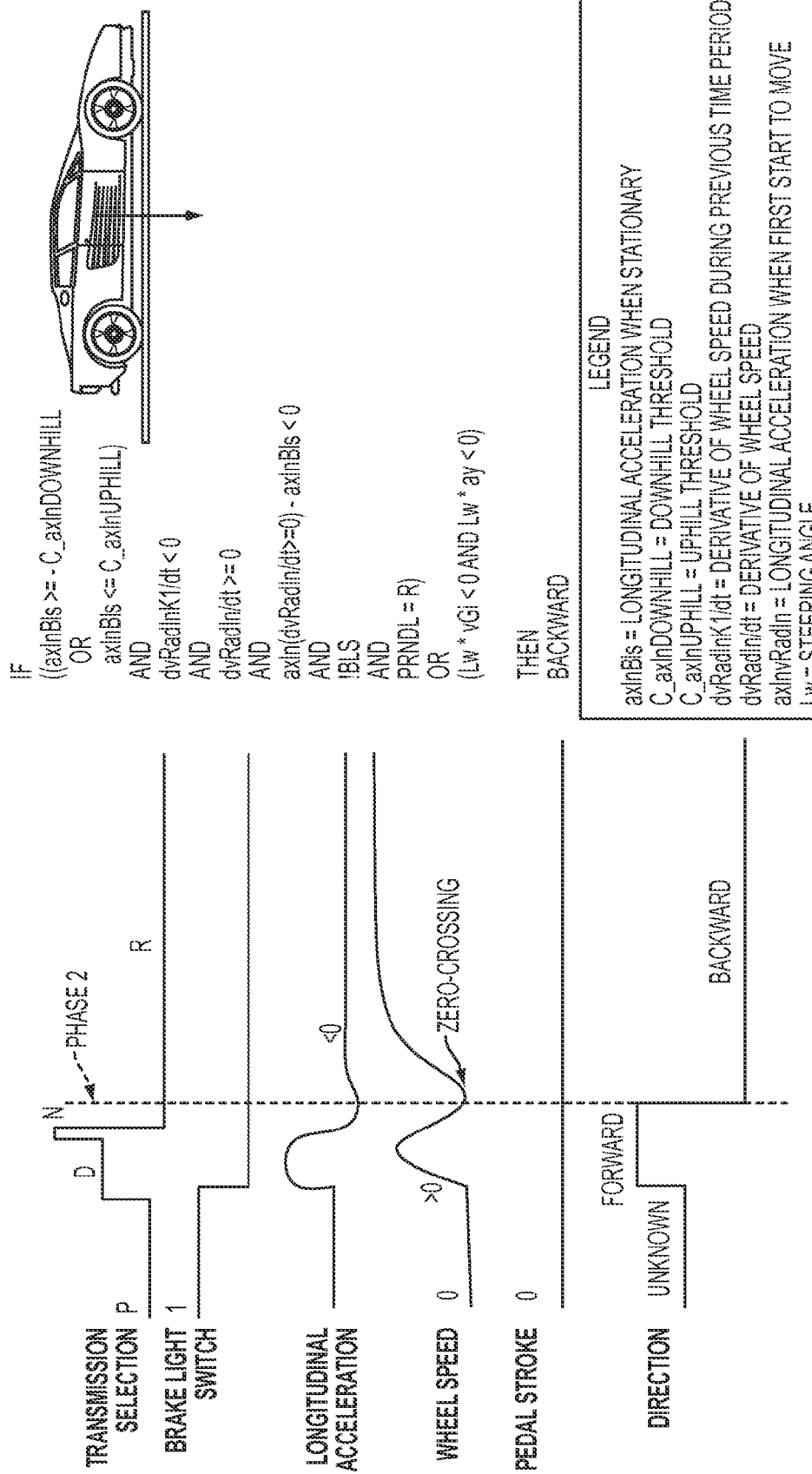
FIG. 13 illustrates phase 2 of the low-speed driving direction detection method of FIG. 12 according to one embodiment of the invention.

FIGS. 12 and 13 illustrate a flat surface case in which a vehicle's transmission shifts from "drive" to "reverse." In this situation, the vehicle 10 initially rolls forward before it begins moving backward in "reverse." Therefore, this situation includes two phases. FIG. 12 illustrates logic for phase 1, which detects if the vehicle is free-rolling forward before driving backward. The general logic for phase 1 follows:

```
If (    (    (1a) the vehicle is on generally flat surface AND
             (2a) the vehicle is accelerating AND
             (3a) the longitudinal acceleration of the vehicle at the time it starts to
                  move minus the longitudinal acceleration of the vehicle when it is
                  substantially stationary is greater than zero AND
             (4a) the vehicle is in "drive"
        )
        OR
        (    (1b) the vehicle's steering angle multiplied by the vehicle's yaw rate is
                  greater than zero AND
             (2b) the vehicle's steering angle multiplied by the vehicle's lateral
                  acceleration is greater than zero
        )
)
THEN, the vehicle is moving forward
```

Step (1a) includes determining whether a sensor reading from the vehicle's longitudinal acceleration when substantially stationary is between the predetermined downhill threshold and the predetermined uphill threshold. If so, the flat surface case is assumed. Step (2a) includes determining whether the derivative of current sensor readings from the vehicle's wheel speed sensor(s) 24 is greater than zero. Step (3a) includes determining whether the vehicle's longitudinal acceleration when it first starts to move minus the vehicle's longitudinal acceleration when it is substantially stationary is greater than zero. Step (4a) determines whether the gear shift sensor 36 indicates that the vehicle's transmission is in "drive." If the LSDDD module 50 determines that all of the steps (1a) through (4a) are satisfied, the LSDDD module 50 outputs a direction indicator (e.g., to the automatic parallel parking control module 52) indicating that the vehicle 10 is moving in a forward direction.

As with other cases, the logic can alternatively use sensor readings from the vehicle's steering angle sensor 28, yaw rate sensor 32, and lateral acceleration sensor 30 to determine whether the vehicle 10 is moving in a forward direction (see steps (1b) and (2b) above). If the LSDDD module 50 determines that both steps (1b) and (2b) are satisfied, the LSDDD module 50 outputs a direction indicator indicating that the vehicle 10 is moving in a forward direction.

FIG. 13 illustrates logic for phase 2, which detects if the vehicle is now moving backward (as a result of the vehicle's transmission being in "reverse" and the operator pressing the accelerator pedal). The general logic for phase 2 follows:

whether the derivative the output from the wheel speed sensors 24 during a previous time period is less than zero. Thus, step (2a) determines whether the vehicle was decelerating during a previous time period. If so, this would indicate that the vehicle was previously decelerating while it was free-rolling forward before the vehicle stopped and started moving backward. Step (3a) determines whether the derivative of current readings from the vehicle's wheel speed sensors 24 is greater than or equal to zero. Step (4a) includes determining whether the vehicle's longitudinal acceleration at or after a zero-crossing point minus the vehicle's longitudinal acceleration when it is substantially stationary is less than zero. As described above, the vehicle's zero-crossing point occurs when the vehicle stops after free-rolling forward and before moving backward. Therefore, the zero-crossing point occurs when the derivative of readings from the vehicle's wheel speed sensors 24 is zero, indicating that the vehicle 10 is stationary. After the zero-crossing point, the vehicle starts moving backward. Therefore, its longitudinal acceleration should be negative at this point.

Finally, steps (5a) and (6a) evaluate the brake light switch sensor 34 and the gear shift sensor 36. If the operator is not pressing the brake pedal and the vehicle's transmission is in "reverse," it is assumed that the vehicle is moving backward. Thus, "!BLS" and "PRNDL=R" are two other factors indicating that backward movement is occurring. If the LSDDD module 50 determines that all of the steps (1a) through (6a) are satisfied, the LSDDD module 50 outputs a direction indicator indicating that the vehicle 10 is moving in a backward direction.

```
If (    (    (1a) the vehicle is on a generally flat surface AND
             (2a) the vehicle was decelerating during a previous time period AND
             (3a) the vehicle's current acceleration is greater than or equal to zero AND
             (4a) the longitudinal acceleration of the vehicle at any time after the
                  vehicle's wheels change from rotating forward to rotating backward minus
                  the longitudinal acceleration of the vehicle when it is substantially
                  stationary is less than zero AND
             (5a) the vehicle's brake light switch is not engaged AND
             (6a) the vehicle is in "reverse"
        )
        OR
        (    (1b) the vehicle's steering angle multiplied by the vehicle's yaw rate is
                  less than zero AND
             (2b) the vehicle's steering angle multiplied by the vehicle's lateral
                  acceleration is less than zero
        )
)
THEN, the vehicle is moving backward
```

Step (1a) includes determining whether the vehicle's longitudinal acceleration when it is substantially stationary is between the predetermined uphill threshold and the predetermined downhill threshold. Step (2a) includes determining As shown in FIG. 13, the logic can alternatively use readings from the vehicle's steering angle sensor 28, yaw rate sensor 32, and lateral acceleration sensor 30 to determine whether the vehicle 10 is moving in a backward direction (see steps (1b) and (2b) above). If the LSDDD module 50 determines that both steps (1b) and (2b) are satisfied, the LSDDD module 50 outputs a direction indicator indicating that the vehicle 10 is moving in a backward direction.

Figure 14:
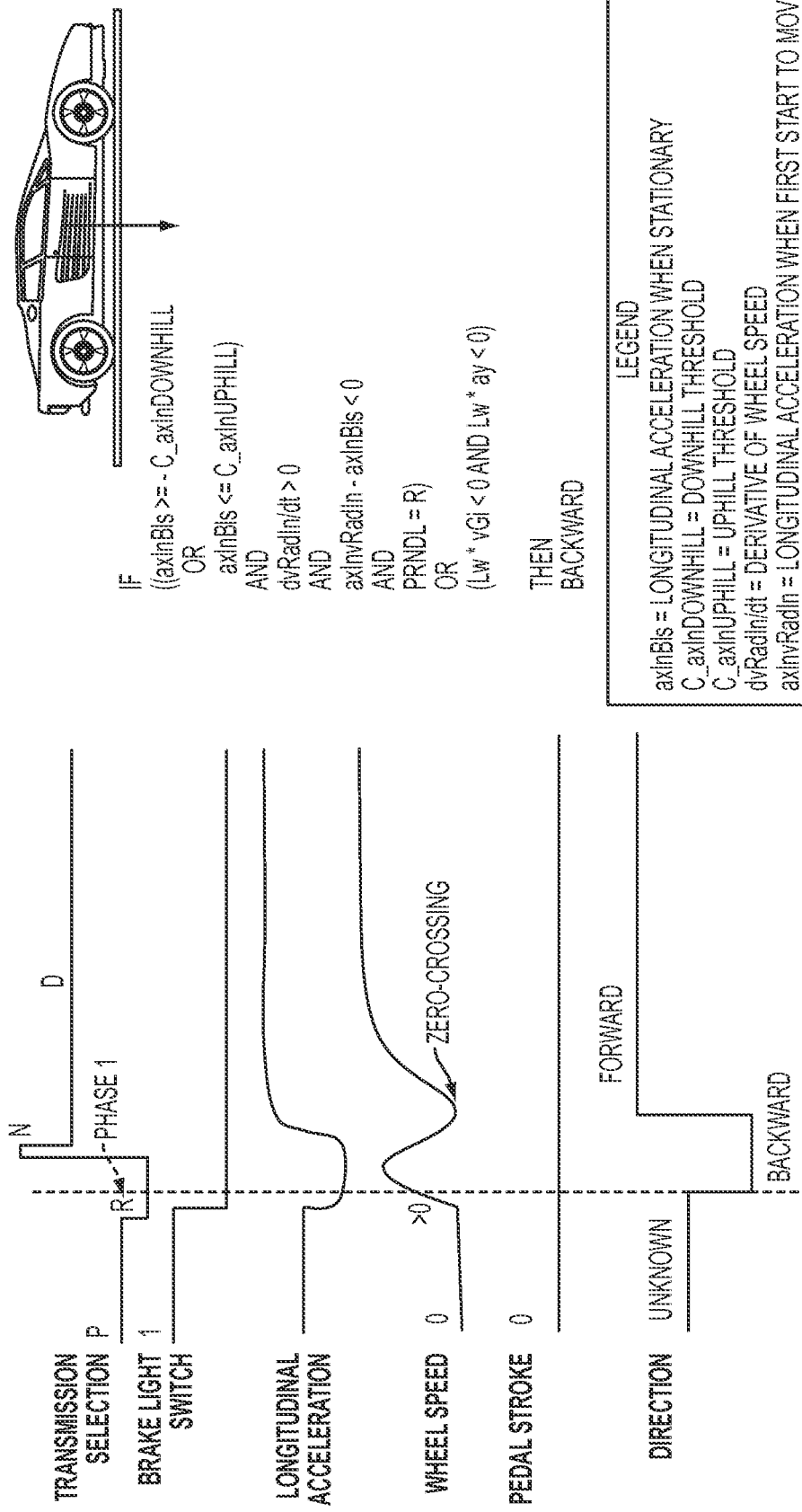
FIG. 14 illustrates phase 1 of a low-speed driving direction detection method for determining a vehicle's direction in a flat surface case based on whether the vehicle's transmission shifts from reverse to drive.
Figure 15:
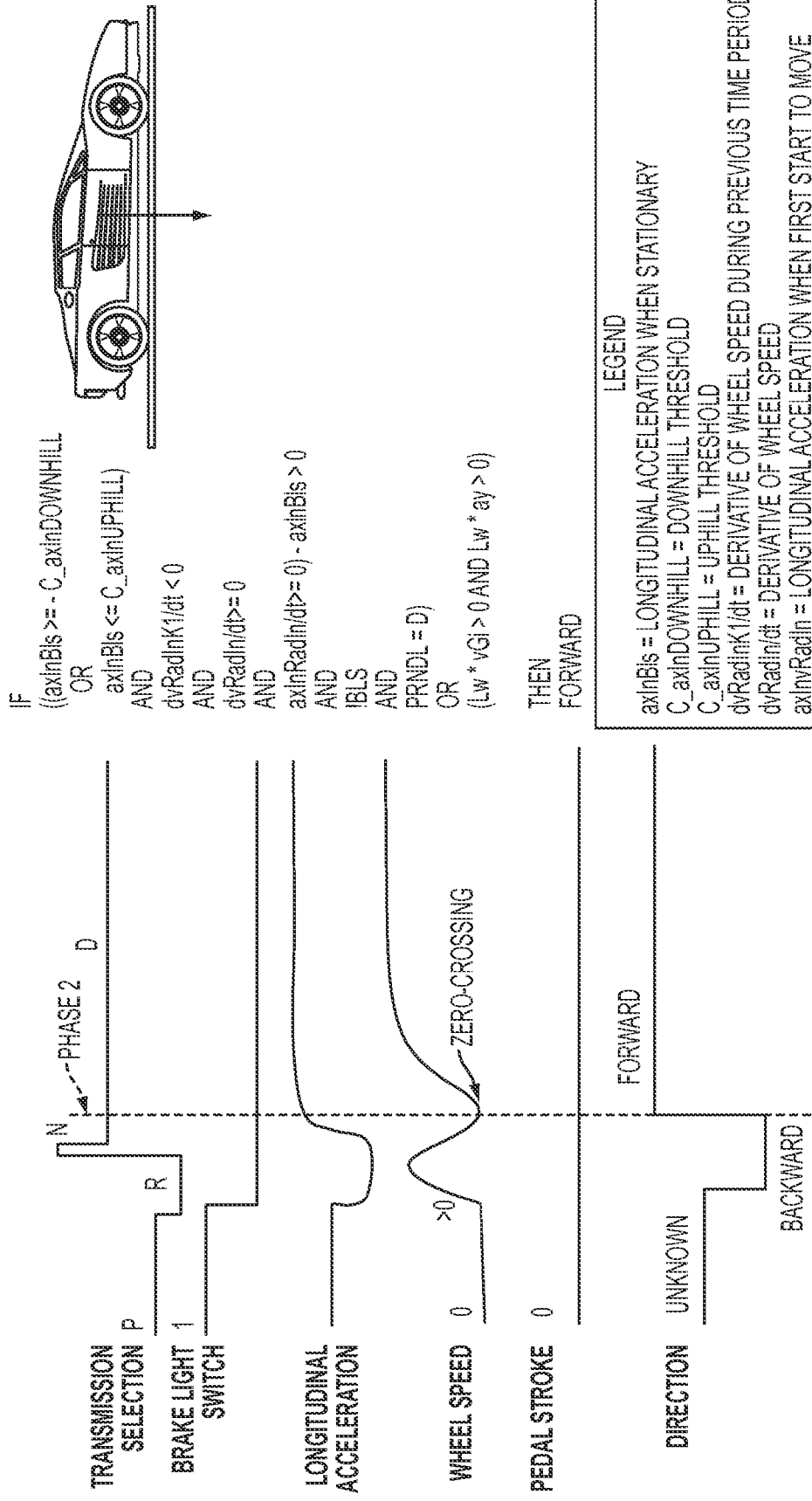
FIG. 15 illustrates phase 2 of the low-speed driving direction detection method of FIG. 14 according to one embodiment of the invention.

FIGS. 14 and 15 illustrate a flat surface case in which a vehicle's transmission shifts from "reverse" to "drive." In this situation, the vehicle 10 initially rolls backward before it begins moving backward in "reverse." Therefore, this situation includes two phases. FIG. 14 illustrates logic for phase 1, which detects if the vehicle is free-rolling backward. FIG. 15 illustrates logic for phase 2, which detects if the vehicle is now moving forward. The logic executed in the situations of FIGS. 14 and 15 is similar to and uses similar labels and functions as the logic of FIGS. 12 and 13. Therefore, the particular details of FIGS. 14 and 15 are not described in detail.

In some embodiments, the automatic parallel parking control module 52 is executed by the same controller 14 that executes the LSDDD module 50. In other embodiments, the automatic parallel parking control module 52 is executed by a different controller than the controller 14 executing the LSDDD module 50 and the controller 14 can output the direction indicator generated by the LSDDD module 50 to the controller executing the automatic parallel parking control module 52 (e.g., over the bus 22). Of course, the LSDDD module 50 can be used to determine the direction of vehicle movement in vehicle applications outside automatic parallel parking. For example, others systems or controllers (such as forward/backward emergency braking systems) that need to know the direction of vehicle movement in low speed situations can obtain and use the direction indicator generated by the LSDDD module 50.

Thus, the invention provides, among other things, a controller and methods for determining a direction in which a vehicle is moving when the vehicle is traveling at low speeds.

What is claimed is:

1. A method of determining a driving direction of a vehicle when the vehicle begins traveling, the method comprising:
    determining whether the vehicle is in one of three states,
    (1) an uphill state in which the vehicle is located on an upward sloping surface, wherein in the uphill state the vehicle is oriented so that selecting and operating the vehicle in a drive gear moves the vehicle forward and upwardly along the upward sloping surface and selecting and operating the vehicle in a reverse gear moves the vehicle downwardly along the sloping surface,
    (2) a downhill state in which the vehicle is located on a downward sloping surface, wherein in the downhill state the vehicle is oriented so that selecting and operating the vehicle in a drive gear moves the vehicle forwardly and downwardly along the downward sloping surface and selecting and operating the vehicle in a reverse gear moves the vehicle backward and upwardly along the sloping surface, and
    (3) a flat surface state in which the vehicle is located on a flat surface;
    obtaining information from a plurality of vehicle sensors; and
    determining, using a processor, a beginning direction of movement from a standstill of the vehicle based upon the determined state of the vehicle and information from the plurality of vehicle sensors, wherein the beginning direction of movement of the vehicle includes at least one of the forward direction and the backward direction,
    wherein determining the beginning direction of movement includes determining a direction of movement based on
    (i) the determined state of the vehicle and
    (ii) a difference between a longitudinal acceleration of the vehicle at a time when the vehicle is at a standstill and a longitudinal acceleration of the vehicle at a time when the vehicle begins moving,
    wherein the processor receives inputs from the plurality of vehicle sensors comprising: an acceleration signal axlnBls from a longitudinal acceleration sensor when a brake light switch is engaged, a wheel speed sensor output dvRadln/dt, a derivative of the wheel speed sensor output during a previous time period dvRadlnK1/dt, a brake light switch off indication !BLS, a gear shift sensor output PRNDL that indicates engagement in a forward direction D or a reverse direction R, an acceleration signal axlnvRadln from the longitudinal acceleration sensor when the vehicle first starts to move, and a predetermined uphill threshold C_axlnUPHILL is provided,
    wherein when the vehicle is in the uphill state located on an upward sloping surface, the processor determines a forward direction of movement after a backward beginning movement if:
    axlnBls is greater than C_axlnUPHILL,
    AND
    dvRadlnK1/dt is less than 0
    AND
    dvRadln/dt is greater than or equal to 0
    AND
    axlnvRadln−axlnBls is greater than or equal to 0
    AND
    !BLS
    AND
    PRNDL=D.

2. The method according to claim 1, wherein when the vehicle is in the uphill state located on an upward sloping surface, the processor determines a rearward direction of beginning movement if:
    axlnBls is greater than C_axlnUPHILL,
    AND
    dvRadln/dt is greater than 0
    AND
    axlnvRadln−axlnBls is less than 0
    AND
    PRNDL =D.

3. The method according to claim 1 wherein determining, when the vehicle is at a standstill, whether the vehicle is in the flat surface state includes evaluating whether the sensor signal from the longitudinal acceleration sensor is between the predetermined uphill threshold and the predetermined downhill threshold.

4. The method according to claim 1 wherein determining a beginning direction of movement of the vehicle includes determining whether a vehicle's drive force is greater, equal to, or less than a weight of the vehicle.

5. The method according to claim 1, including the step of automatically controlling the vehicle to perform a parallel parking maneuver based on the beginning direction of movement of the vehicle.

6. A system for determining a driving direction of a vehicle starting from a standstill, the system comprising:
    a controller; and
    a plurality of sensors connected to the controller, each of the sensors configured to transmit information to the controller;

wherein, the controller is programmed to determine whether the vehicle is in one of three states:
(1) an uphill state in which the vehicle is located on an upward sloping surface, wherein in the uphill state the vehicle is oriented so that selecting and operating the vehicle in a drive gear moves the vehicle forwardly and upwardly along the upward sloping surface and selecting and operating the vehicle in a reverse gear moves the vehicle downwardly along the sloping surface,
(2) a downhill state in which the vehicle is located on a downward sloping surface, wherein in the downhill state the vehicle is oriented so that selecting and operating the vehicle in a drive gear moves the vehicle forwardly and downwardly along the downward sloping surface and selecting and operating the vehicle in a reverse gear moves the vehicle backwardly and upwardly along the sloping surface, and
(3) a flat surface state in which the vehicle is located on a flat surface, and determine a beginning direction of movement of the vehicle based upon the determined state of the vehicle and information from the plurality of sensors, wherein the beginning direction of movement of the vehicle includes at least one of the forward direction and a backward direction, wherein the controller determines the beginning direction of movement based on
(i) the determined state of the vehicle and
(ii) a difference between an acceleration signal from a longitudinal acceleration sensor when the vehicle first moves from a standstill minus an acceleration signal from the longitudinal acceleration sensor when the vehicle is at a standstill to determine a driving direction of the vehicle,
wherein the controller receives inputs as: the acceleration signal axlnBls from the longitudinal acceleration sensor when a brake light switch is engaged, a predetermined uphill threshold C_axlnUPHILL, a wheel speed sensor output dvRadln/dt, a derivative of the wheel speed sensor output during a previous time period dvRadlnK1/dt, a brake light switch off indication !BLS, a gear shift sensor output PRNDL that indicates engagement in a forward direction D or a reverse direction R, and an acceleration signal axlnvRadln from the longitudinal acceleration sensor when the vehicle first starts to move,
wherein when the vehicle is in the uphill state located on an upward sloping surface, the controller determines a forward direction of movement after a backward beginning movement if:
axlnBls is greater than C_axlnUPHILL,
AND
dvRadlnK1/dt is less than 0
AND
dvRadln/dt is greater than 0
AND
axlnvRadln−axlnBls is greater than or equal to 0
AND
!BLS
AND
PRNDL=D.

7. The system of claim 6, wherein the controller is programmed to determine whether a vehicle's drive force is greater, equal to, or lower than a weight of the vehicle.

8. The system of claim 6, the controller programmed for determining direction of movement,
wherein when the vehicle is in the uphill state located on an upward sloping surface, the controller determines a forward direction of beginning movement when
vehicle steering angle multiplied by vehicle yaw rate is greater than zero and the vehicle steering angle multiplied by vehicle lateral acceleration is greater than zero,
wherein when the vehicle is in the uphill state located on an upward sloping surface, the controller determines a backward direction of beginning movement when
the vehicle steering angle multiplied by the vehicle yaw rate is less than zero and the vehicle steering angle multiplied by the vehicle lateral acceleration is less than zero.

9. The system of claim 6, wherein when the vehicle is in the uphill state located on an upward sloping surface, the controller determines a rearward direction of beginning movement if:
axlnBls is greater than C_axlnUPHILL,
AND
dvRadln/dt is greater than 0
AND
axlnvRadln−axlnBls is less than 0
AND
PRNDL=D.

* * * * *